Jan. 12, 1954 I. VANVICK Re. 23,771

SNOWPLOW

Original Filed Feb. 4, 1948 3 Sheets-Sheet 1

INVENTOR
ISAK VANVICK
BY S. H. Broddock
ATTORNEY

SNOWPLOW

Original Filed Feb. 4, 1948 3 Sheets-Sheet 2

INVENTOR
ISAK VANVICK
BY S. H. Braddock
ATTORNEY

Jan. 12, 1954 I. VANVICK Re. 23,771

SNOWPLOW

Original Filed Feb. 4, 1948 3 Sheets-Sheet 3

INVENTOR
ISAK VANVICK
BY S. H. Braddock
ATTORNEY

Reissued Jan. 12, 1954 Re. 23,771

UNITED STATES PATENT OFFICE 23,771

SNOWPLOW

Isak Vanvick, Minneapolis, Minn., assignor, by mesne assignments, to Merry Manufacturing Company, Inc., a corporation of Washington Original No. 2,587,415, dated February 26, 1952, Serial No. 6,219, February 4, 1948. Application for reissue September 18, 1953, Serial No. 381,151

1 Claim. (Cl. 37—43)

Matter enclosed in heavy brackets [ ] appears in the original patent but forms no part of this reissue specification; matter printed in italics indicates the additions made by reissue.

This invention has relation to a snowplow.

An object of the invention is to provide a machine for removing or handling snow wherein will be incorporated desirable and improved features and characteristics of construction novel both as individual entities of the machine and in combination with each other.

A further object is to provide a machine for removing snow which can be self-propelling.

A further object is to provide a snow handling machine which will be effective in wet and sticky snow.

A further object is to provide a snow plow incorporating features and characteristics as hereinafter set forth.

With the above objects in view, as well as others which will appear as the specification proceeds, the invention comprises the construction, arrangement and combination of parts as now to be fully described and hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification,

Figure 1:
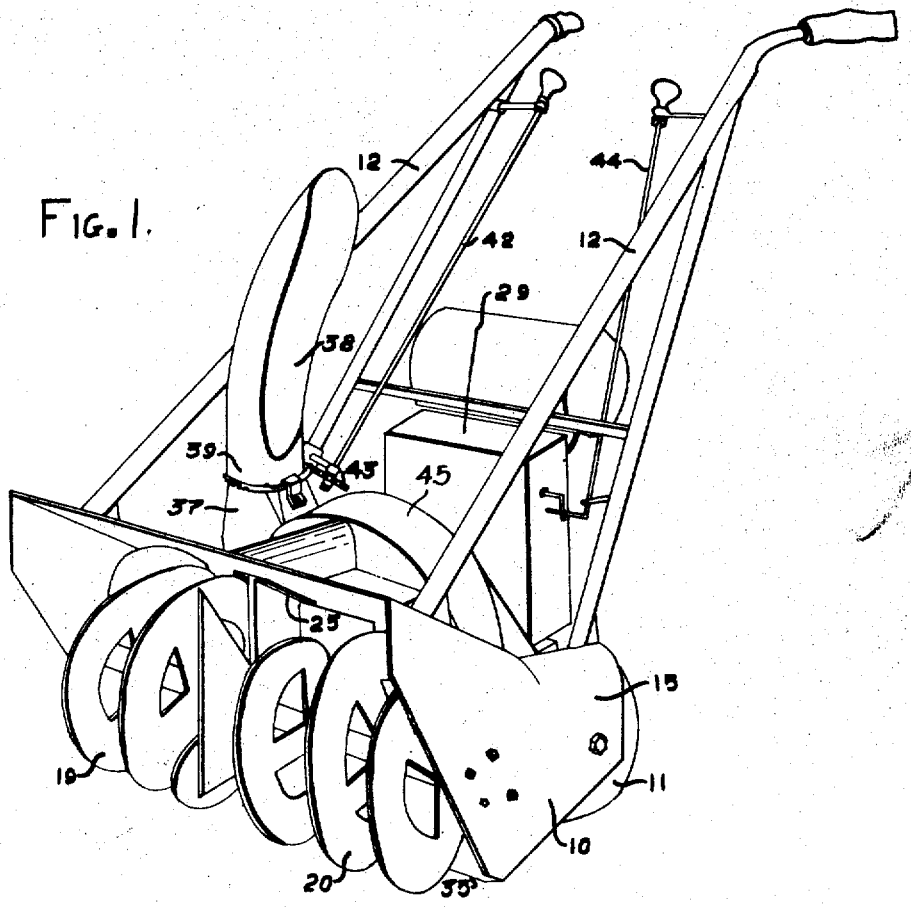
Fig. 1 is a perspective view of a snow plow made according to the invention.
Figure 6:
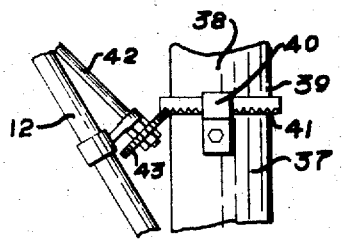
Fig. 6 is a fragmentary elevational view detailing an adjustable deflector of the snow plow.
Figure 2:
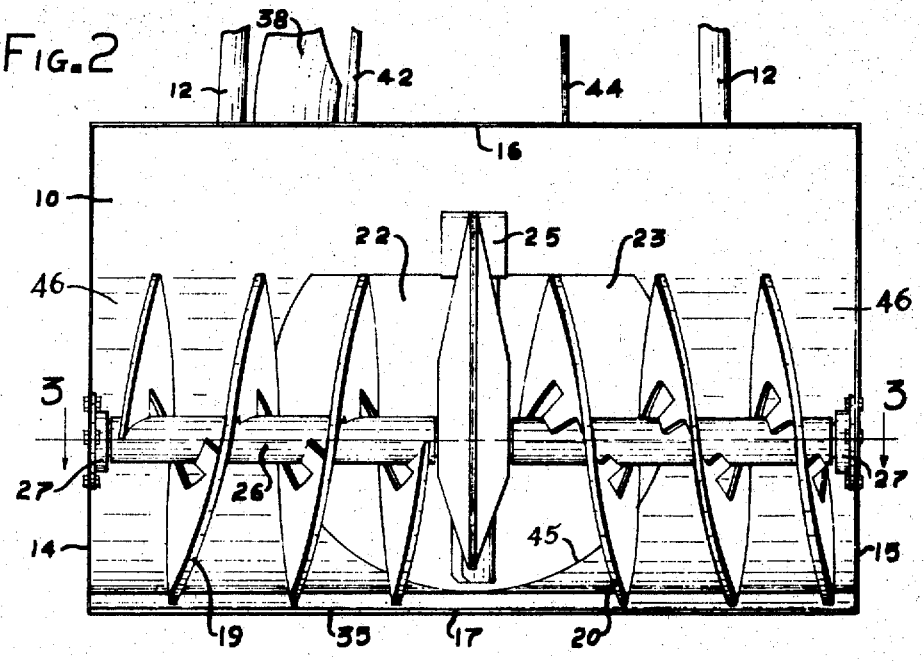
Fig. 2 is an enlarged fragmentary front elevational view of the snow plow of Fig. 1.
Figure 3:
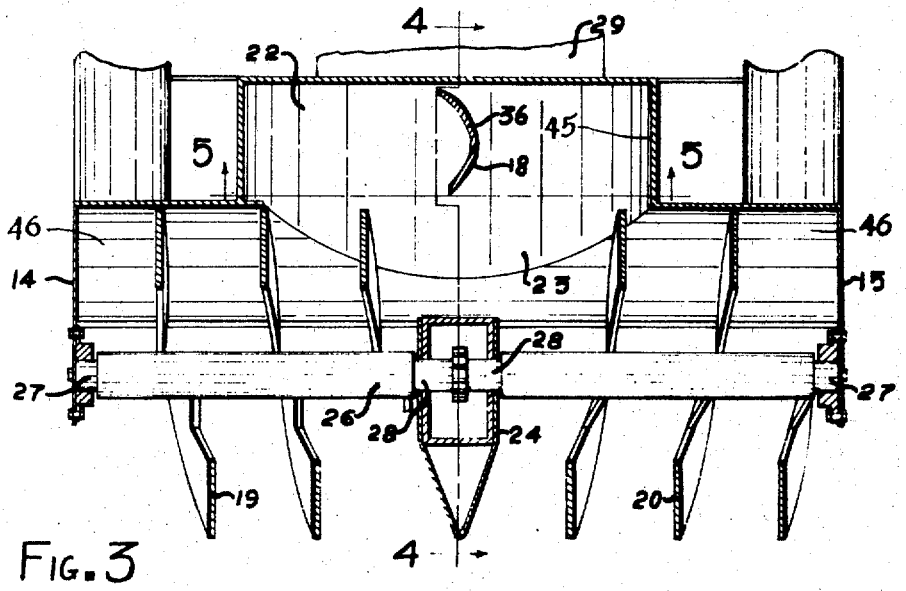
Fig. 3 is a horizontal sectional view, taken on line 3—3 in Fig. 2.
Figure 4:
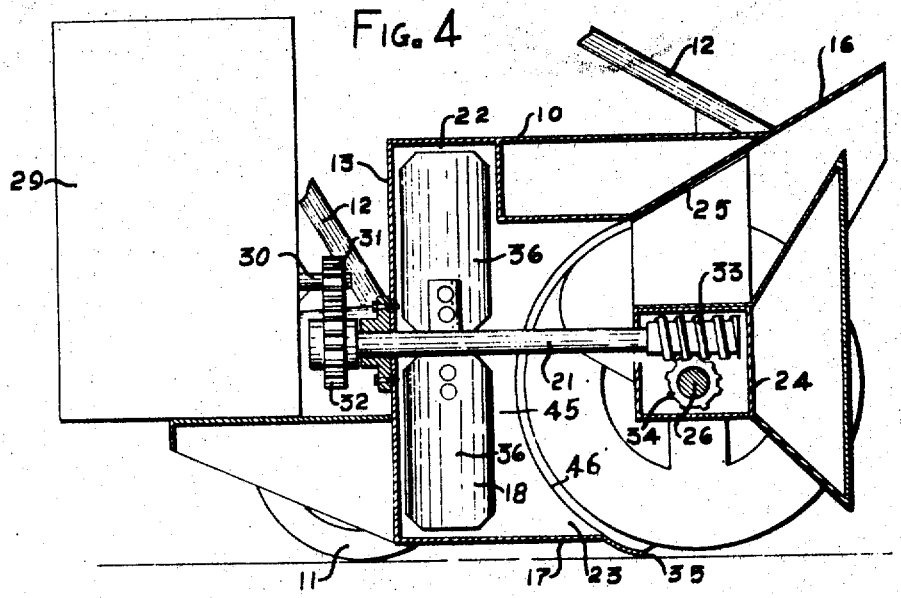
Fig. 4 is a vertical sectional view, taken as on line 4—4 in Fig. 3.

With respect to the drawings and the numerals of reference thereon, 10 represents a frame of the snow plow, 11 indicates supporting wheels for said frame, and 12 designates guide handles on said frame for said snowplow. The snowplow is adapted to be manually guided, and a rotatable element and feed screws of a snow removing or handling entity of said snowplow are adapted to be driven through the instrumentality of mechanism to be described. The snowplow can be propelled either manually or through the instrumentality of the feed screws.

The frame 10 includes an upright rear wall 13, upright side walls 14 and 15, an upper wall 16, a lower wall 17, and a cylindrical wall 45 disposed between said rear wall 13 and the upper, lower and side walls. A rear part-cylindrical wall 46, between the end walls 14 and 15 and exterior of the cylindrical wall 45, connects the upper and lower walls 16 and 17. The rear wall 13, the side walls 14 and 15, the upper wall 16, the lower wall 17, the cylindrical wall 45 and the part-cylindrical wall 46 are integrally connected in any suitable and convenient manner, as by welding or riveting.

The rear wall 13, the side walls 14 and 15, the upper wall 16, the lower wall 17, the cylindrical wall 45 and the part-cylindrical wall 46 cooperate with a rotatable element 18 and feed screws 19 and 20 of the snowplow to provide a snow removing or handling entity for said snowplow. Said rotatable element 18 is fixed upon a longitudinal horizontal shaft 21 and is situated in an annular chamber 22 contiguous with the rear wall 13 and provided by the cylindrical wall 45. A passageway 23 is bounded by said cylindrical wall 45 and upper wall 16, is located forwardly of and is contiguous with said annular chamber 22. Opposite end portions of said shaft 21 are mounted in the rear wall 13 and in a gear box 24 suitably and conveniently supported, as at 25, upon the midlength of the upper wall 16. One of the feed screws 19, 20 is right and the other is left, and said feed screws 19, 20 are fixedly supported upon a transverse horizontal shaft 26 disposed forwardly of the annular chamber 22 and having its opposite ends rotatably mounted, as at 27, upon the side walls 14 and 15. An intermediate part of the shaft 26 is mounted, as at 28, in the gear box, and the feed screws 19 and 20 are at opposite sides of said gear box directly in front of the annular passageway 23 to the annular chamber 22.

The supporting wheels 11 are upon a rearward portion of the frame 10, and a forward portion of the lower wall 17 of said frame is adapted to lie in adjacent relation to the ground while the snowplow is being propelled through the medium of the handles 12. Lower portions of the feed screws 19 and 20 are at an elevation a trifle above that of said lower wall 17 when the plow is being thus manually propelled.

The frame 10 suitably and conveniently supports an internal combustion engine 29 of the snowplow which is adapted to the purpose of driving or turning the rotatable element 18 and the shaft 26 supporting the feed screws 19 and 20. As shown, the shaft 30 of the engine 29 rigidly supports a gear 31 which meshes with a gear 32 fixed on the shaft 21, and a worm 33 on said shaft 21 meshes with a worm gear 34 fixed upon said shaft 26. Upon operation of the internal combustion engine 29, the rotatable element 18 will be driven or turned through the instrumentality of the gears 31 and 32 and the shaft 21, and the shaft 26, together with the feed screws 19 and 20 fixed thereon, will be driven or turned through the instrumentality of said gears 31 and 32, said shaft 21, said worm gear 33 and said worm gear 34.

Forward portions of the side walls 14 and 15, the upper wall 16, the lower wall 17 and part-cylindrical wall 46 together form an open faced snow gathering chamber in which the feed screws operate. The forward portion of upper wall 16 extends upward and outward from the top of the feed screws 19 and 20. The part-cylindrical wall 46 is concentric with and situated close to the feed screws 19 and 20, and the forward margin of said lower wall 17 is constituted as a knife edge 35.

The rotatable element 18 is constituted as a pair of snow transporting elements 36 situated at opposite sides of and disposed radially of the shaft 21. Each snow transporting element 36 is straight in the direction of its length and curvilinear in cross-section.

The snow transporting elements 36 are arranged concentrically of and in comparatively close relation to the cylindrical wall bounding the annular chamber 22, and said snow transporting elements are in vertical alinement with a vertical outlet passageway 37 from said annular chamber.

Figure 5:
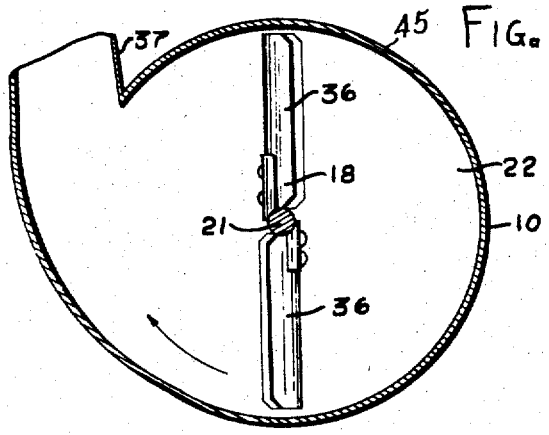
Fig. 5 is a detail sectional view, taken as on line 5—5 in Fig. 3.

The rotatable element 18 is revolved so that its snow transporting elements 36 move in the direction of the arrow in Fig. 5, and said snow transporting elements 36 have width a bit less than the width of the annular chamber 22. The arrangement is such that the concave surfaces of the snow transporting elements are the working and transporting surfaces, respectively, thereof.

The shaft 26, with the feed screws 19, 20, is revolved so that said feed screws will cause snow to be fed interiorly of the snow plow, toward the gear box 24.

The vertical outlet passageway 37 supports an adjustable snow deflector 38 which can be of ordinary or preferred construction, and means for manipulating said adjustable snow deflector is supported upon the guide handles 12. More explicitly, the lower end portion 39 of the snow deflector 38 is rotatably supported upon the upper end portion of the vertical outlet passageway 37, a clip 40 is for the purpose of retaining said snow deflector 38 and outlet passageway 37 in assembled relation, and a gear 41 at the lower end of said snow deflector is for accomplishing rotational adjustment of the snow deflector. An adjusting rod 42, rotatably supported on the guide handles 12 in any suitable and convenient manner, fixedly carries a gear 43 which is in mesh with the gear 41. Clearly, the snow deflector 38 can be adjustably rotated on the outlet passageway 37 in response to rotation of the adjusting rod 42.

A rotatable adjusting rod 44, also on the guide handles 12, is adapted to be manipulated to the accomplishment of control of the internal combustion engine 29. Said internal combustion engine can be of any character suitable to its intended purpose.

The manner in which the snow plow operates will be evident. The plow may be propelled either manually from the guide handle 12 or under the power of the engine 29. When power propulsion is desired, the guide handles are elevated to tip the snow plow forward. This brings feed screws 19 and 20 in contact with the ground and brings wheels 11 in spaced relation with the ground. The construction and arrangement are such that feed screws 19 and 20 will be rotated in direction to cause the snow plow to be propelled forwardly when the feed screws are rested on the ground.

Under either method of propulsion, the open faced snow gathering chamber will direct the snow and ice into the snow plow. The forward portion of upper wall 16 will direct snow down into the feed screws 19 and 20, while said feed screws cooperate to feed and direct snow and ice from the front of the snow plow to the annular passageway 23 whence said snow and ice will enter the annular chamber 22 concurrently with movement ahead of the snow plow. The part-cylindrical wall 46 and the side walls 14 and 15, by their close proximity to the rotating feed screws 19 and 20, act to prevent any sticky or wet snow from accumulating adjacent to the feed screws 19 and 20 where it would tend to retard the movement of said screws. The snow transporting elements 36 are adapted to cause snow and ice to be forced through the outlet passageway 37 and the snow deflector 38 out of the machine. Each snow transporting element 36 will carry an individual load or shovelful of snow up through said outlet passageway 37. The rotatable element 18 will be revolved at a high rate of speed, and the snow and ice will leave the outlet passageway 37 in the form of individual and separate charges of snow and ice each equal in amount to a shovelful of snow and ice forced out of the machine under considerable momentum by the centrifugal force exerted through the snow transporting elements 36.

What is claimed is:

[1. A drive mechanism for a snow plow comprising a helical feed screw horizontally and transversely mounted on said plow at a forward portion thereof and disposed to have a lowermost part of said screw normally slightly spaced from and immediately adjacent the ground, power actuated means for causing said feed screw to be rotated, a pair of supporting wheels rotatably mounted on said plow on an axis parallel to the axis of said feed screw and rearward thereof for supporting the plow in normal operation under manual propulsion, and an actuating handle rigid with said plow for manually propelling and guiding said plow in normal operation and for raising said wheels from the ground and bringing said feed screw in operative connection with the ground to effect forward drive of the plow in response to actuation of said power actuated means.]

[2. In a rotary snow plow having a helical feed screw at a forward portion thereof for conveying snow to a rotary snow transporting element disposed rearwardly of and communicating with said feed screw, a drive mechanism comprising said helical feed screw horizontally and transversely mounted to have a lowermost portion thereof in close proximity to the ground, power actuated means for causing said feed screw to be rotated, a pair of supporting wheels rotatably mounted on said plow rearward of said feed screw on an axis parallel to the axis of the feed screw for supporting said plow in normal operation under manual propulsion, and an actuating handle rigid with said plow for manually propelling and guiding said plow in normal operation and for raising said wheels from the ground and bringing said feed screw into operative connection with the ground to effect forward drive of the plow in response to actuation of said power actuated means.]

[3. In a rotary snow plow, the combination with a frame, a prime mover mounted on said frame, and a rotary snow transporting unit on said frame operably connected with said prime mover, of a helical feed screw horizontally and transversely mounted on a forward portion of said frame in close proximity to the ground for conveying snow to a position directly forward of said snow transporting unit, means connecting said prime mover and said helical feed screw to cause said feed screw to be rotated downwardly at a forward portion thereof in response to operation of said prime mover, a pair of supporting wheels rotatably mounted on the frame on an axis parallel to the axis of said feed screw and rearwardly thereof for supporting said plow in normal operation under manual propulsion, and an actuating handle rigid with said plow for manually propelling and guiding said plow in normal operation and for raising said wheels from the ground and bringing said feed screw in operative connection with the ground to effect forward drive of the plow in response to rotation of the feed screw.]

*4. In a rotary self-propelled snow-plow, a frame having a steering handle extending rearwardly therefrom, a power source carried by said frame, a pair of axially aligned helical feed screws of opposite pitch journal-mounted on a forward portion of said frame and having a common rotary axis horizontal and transverse of said frame, said frame being formed rearwardly of said feed screws to provide an annular chamber with a discharge outlet and an open front, said feed screws being arranged to feed snow centrally and direct it rearwardly to said chamber as the feed screws are rotated downwardly at a forward portion thereof, said feed screws giving ground support for at least part of the weight of the snow-plow so as to have sufficient traction to*

*propel the snow-plow forwardly as said feed screws are rotated as aforesaid, a rotary snow transporting element journal-mounted in said chamber for cooperation therewith and for rotation in a direction for discharging the snow fed to the chamber through said outlet, the rotary axis of said element lying substantially in a vertical plane perpendicular to the common rotary axis of the feed screws at a point substantially midway between said feed screws, said chamber having a majority of its open front disposed between the ground and a horizontal plane tangent to the upper edges of the feed screws, said frame having side walls extending rearwardly of said feed screws to help direct the rearwardly fed snow to said chamber, and means interconnecting said power source with said feed screws and snow transporting element to cause the same to rotate as aforesaid in response to the operation of said power source.*

ISAK VANVICK.

References Cited in the file of this patent or the original patent

UNITED STATES PATENTS

| Number | Name | Date |
|---|---|---|
| 1,587,449 | Wandscheer | June 1, 1926 |
| 1,636,168 | Butterfield | July 19, 1927 |
| 1,701,787 | Messlin | Feb. 12, 1929 |
| 1,820,707 | Moen et al. | Aug. 25, 1931 |
| 2,092,536 | Sicard | Sept. 7, 1937 |
| 2,151,491 | Washburn | Mar. 21, 1939 |
| 2,168,866 | Gehl | Aug. 8, 1939 |
| 2,220,342 | Maga | Nov. 5, 1940 |
| 2,278,220 | Sicard | Mar. 31, 1942 |
| 2,373,318 | Lewin | Apr. 10, 1945 |
| 2,375,965 | Turtle | May 15, 1945 |
| 2,381,017 | Wandscheer | Aug. 7, 1945 |
| 2,642,680 | Curtis et al. | June 23, 1953 |

FOREIGN PATENTS

| Number | Country | Date |
|---|---|---|
| 27,779 of 1930 | Australia | June 18, 1931 |
| 298,119 | Great Britain | Oct. 11, 1928 |